(12) United States Patent
Dobrynin et al.

(10) Patent No.: US 12,505,855 B1
(45) Date of Patent: Dec. 23, 2025

(54) MAGNETIC STACK, AND RELATED DATA STORAGE DEVICES, SYSTEMS, AND METHODS

(71) Applicant: Seagate Technology LLC, Fremont, CA (US)

(72) Inventors: Alexey Dobrynin, Londonderry (GB); Kevin Anthony McNeill, Londonderry (GB); Mark Anthony Gubbins, Letterkenny (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/753,579

(22) Filed: Jun. 25, 2024

(51) Int. Cl.
*G11B 5/127* (2006.01)
*G11B 5/00* (2006.01)

(52) U.S. Cl.
CPC .... *G11B 5/1278* (2013.01); *G11B 2005/0021* (2013.01)

(58) Field of Classification Search
CPC ... G11B 5/3903; G11B 5/3906; G11B 5/3926; G11B 5/3932; G11B 5/02; G11B 5/3929; G11B 2005/0029; G11B 5/672
USPC .................................................. 360/324.11
See application file for complete search history.

(56) References Cited

U.S. PATENT DOCUMENTS

| | | | |
|---|---|---|---|
| 6,280,813 B1 | 8/2001 | Carey et al. | |
| 7,551,409 B2 | 6/2009 | Carey et al. | |
| 10,490,221 B1 | 11/2019 | Chen | |
| 11,567,834 B2 | 1/2023 | Bent et al. | |
| 11,769,526 B1 | 9/2023 | Fan et al. | |
| 2007/0065681 A1 | 3/2007 | Girt et al. | |
| 2011/0085267 A1* | 4/2011 | Benakli | G11B 5/82 |

OTHER PUBLICATIONS

"Magnetic Thermal Annealing: An Effective Process to Enhance the Performance of Magnetic Devices and Materials," Micro Magnetics Sensible Solutions, Retrieved from 'https://www.micromagnetics.com > anneal_notes,' (4 pages).
Lee, "Antiferromagnetism could speed up your hard drive-eventually," ars Technica, Aug. 27, 2009, Retrieved from https://arstechnica.com/science/2009/08/maybe-antiferromagnetism-can-speed-up-your-hard-drive/ (5 pages).
Komlev et al., "3D time-resolved analysis of the evolution metamagnetic phase transition in FeRh system," eprint arXiv:2211.15984, Nov. 2022, (24 pages).
Skumryev et al., "Beating the superparamagnetic limit with exchange bias," Nature, vol. 423, Issue 6942, Jun. 2003, (7 pages).
Quintana et al., "Voltage-Controlled ON-OFF Ferromagnetism at Room Temperature in a Single Metal Oxide Film," ACS NANO, vol. 12, pp. 10291-10300, 2018, (10 pages).
HAMR, HAMR Technology, Technology Paper, Seagate Technology, LLC, 2017, (7 pages).

(Continued)

*Primary Examiner* — Nabil Z Hindi
(74) *Attorney, Agent, or Firm* — Kagan Binder, PLLC

(57) ABSTRACT

A magnetic stack having a magnetic recording layer. The magnetic recording layer includes a plurality of ferromagnetic, discrete regions located within a matrix of at least one magnetic composition that is antiferromagnetic. Each ferromagnetic, discrete region corresponds to a magnetic domain for storing a bit of data. Related data storage devices, systems, and methods.

20 Claims, 7 Drawing Sheets

(56) References Cited

OTHER PUBLICATIONS

Hao, Z., "Investigation of bit patterned media, thermal flying height control sliders and heat assisted magnetic recording in hard disk drives", UC San Diego Electronic Theses and Dissertations, Retrieved from the Internet: https://escholarship.org/uc/item/3nd3d29b, 2011, pp. 1-255.

* cited by examiner

MAGNETIC STACK, AND RELATED DATA STORAGE DEVICES, SYSTEMS, AND METHODS

BACKGROUND

Data storage devices such as hard-disk drives (HDDs) using heat-assisted magnetic recording (HAMR) technology typically utilize a laser on a read/write head to heat a small spot on a magnetic recording disk to permit relatively high areal density capability (ADC) with relatively high anisotropy media. Heating the magnetic recording disk temporarily reduces the coercivity of the magnetic media, which enables the read/write head to change the magnetization direction of a bit and thus store information to the magnetic media. There is a continuing desire to increase ADC even further, which can be technically challenging.

SUMMARY

The present disclosure includes embodiments of a magnetic stack having a magnetic recording layer. The magnetic recording layer includes a plurality of ferromagnetic, discrete regions located within a matrix of at least one magnetic composition that is antiferromagnetic. Each ferromagnetic, discrete region corresponds to a magnetic domain for storing a bit of data.

The present disclosure also includes embodiments of a method of manufacturing at least a portion of a magnetic recording layer of a magnetic stack. The method includes forming a layer on a first major surface of a substrate. The layer includes at least one magnetic composition that is antiferromagnetic. The method also includes converting a plurality of discrete regions in the layer into ferromagnetic, discrete regions within a matrix of the antiferromagnetic, magnetic composition. Each ferromagnetic, discrete region corresponds to a magnetic domain for storing a bit of data.

BRIEF DESCRIPTION OF THE DRAWINGS

The discussion below makes reference to the following figures, wherein the same reference number may be used to identify the similar/same component in multiple figures. The schematic figures are for illustration purposes and are not necessarily drawn to scale.

DETAILED DESCRIPTION

The present disclosure relates to an improved magnetic recording layer, and method of making, for use with data storage devices such hard disk drives (HDDs). Various types of magnetic recording mechanisms are used in hard disk drives. Non-limiting examples of magnetic recording mechanisms include longitudinal magnetic recording (LMR), perpendicular magnetic recording (PMR), shingled magnetic recording (SMR), and heat assisted magnetic recording (HAMR). A heat-assisted magnetic recording mechanism may be used in conjunction with an LMR, PMR, or SMR technique, to achieve higher areal storage density. A hard disk drive that includes a magnetic recording layer according to the present disclosure can include any of these types of recording mechanisms.

Figure 1A:
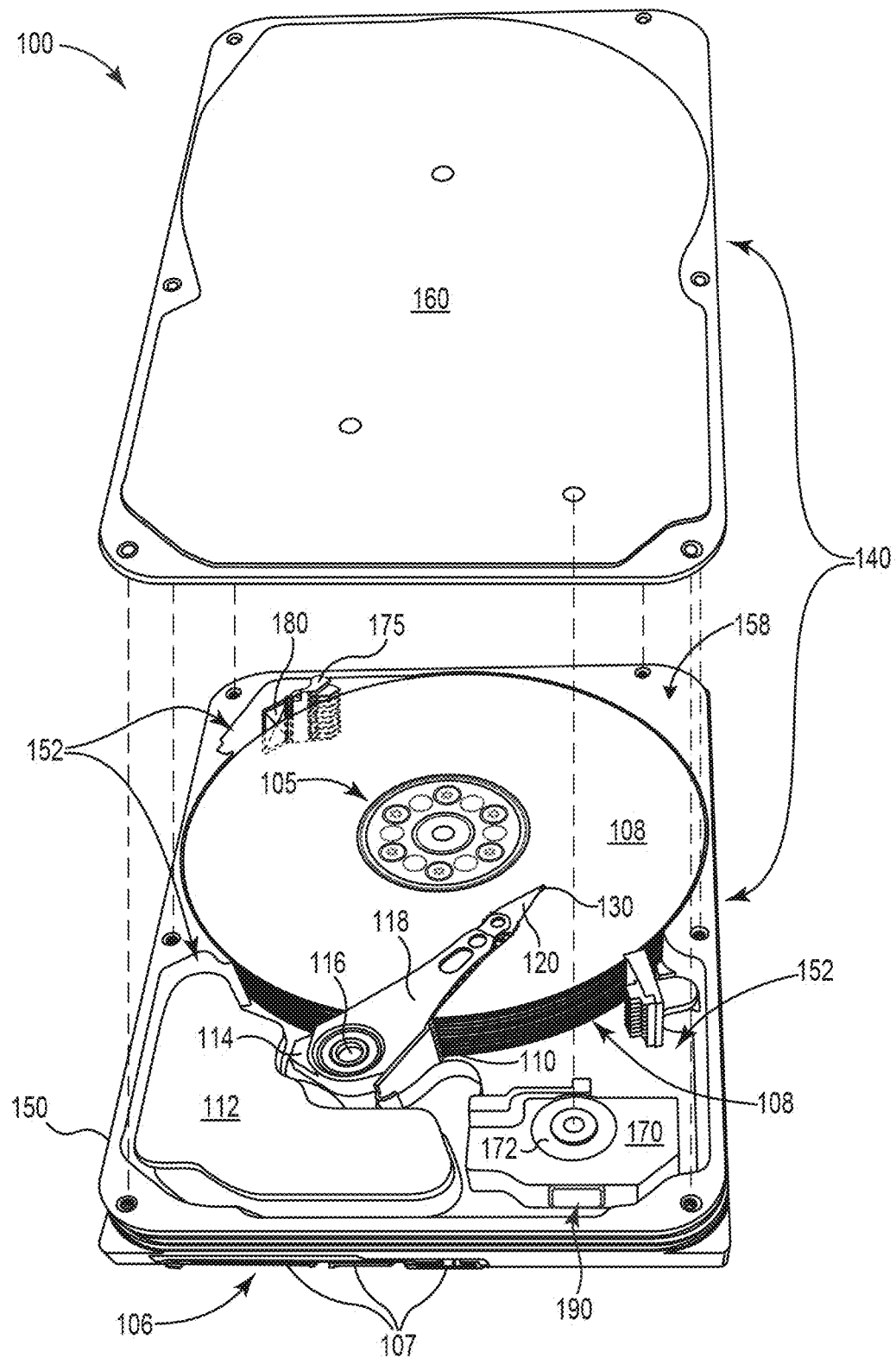
FIG. 1A is a schematic showing an exploded, perspective view of a non-limiting example of a hard disk drive that may include a magnetic stack according to the present disclosure.

Before discussing a magnetic recording layer according to the present disclosure, a non-limiting example of a data storage device 100 that may include one or more magnetic stacks will be described with respect to FIGS. 1A and 1B.

Data storage device 100 is illustrated as an HDD that includes an outer enclosure or housing 140 configured to contain multiple hard-disk drive components, including electronic components. Housing 140 includes a base 150 and a top cover 160. Base 150 includes a recess or cavity 152 configured to accommodate components of data storage device 100. Data storage device 100 further includes a printed circuit board assembly (PCBA) 106. PCBA 106 of this configuration is coupled to base 150 and includes a plurality of input/output connectors 107 that are each configured to provide an interface between one or more components of data storage device 100 and one or more host devices (e.g., a computer, a server, a consumer electronic device, or the like).

Base 150 and top cover 160 may be formed from any suitable material, such as metal (e.g., aluminum), plastic, or other suitable material or combinations thereof. In some embodiments, base 150 includes multiple components, such as an outer frame and a bottom cover, that are coupled together (e.g., by screws, welding, or the like).

Figure 1B:
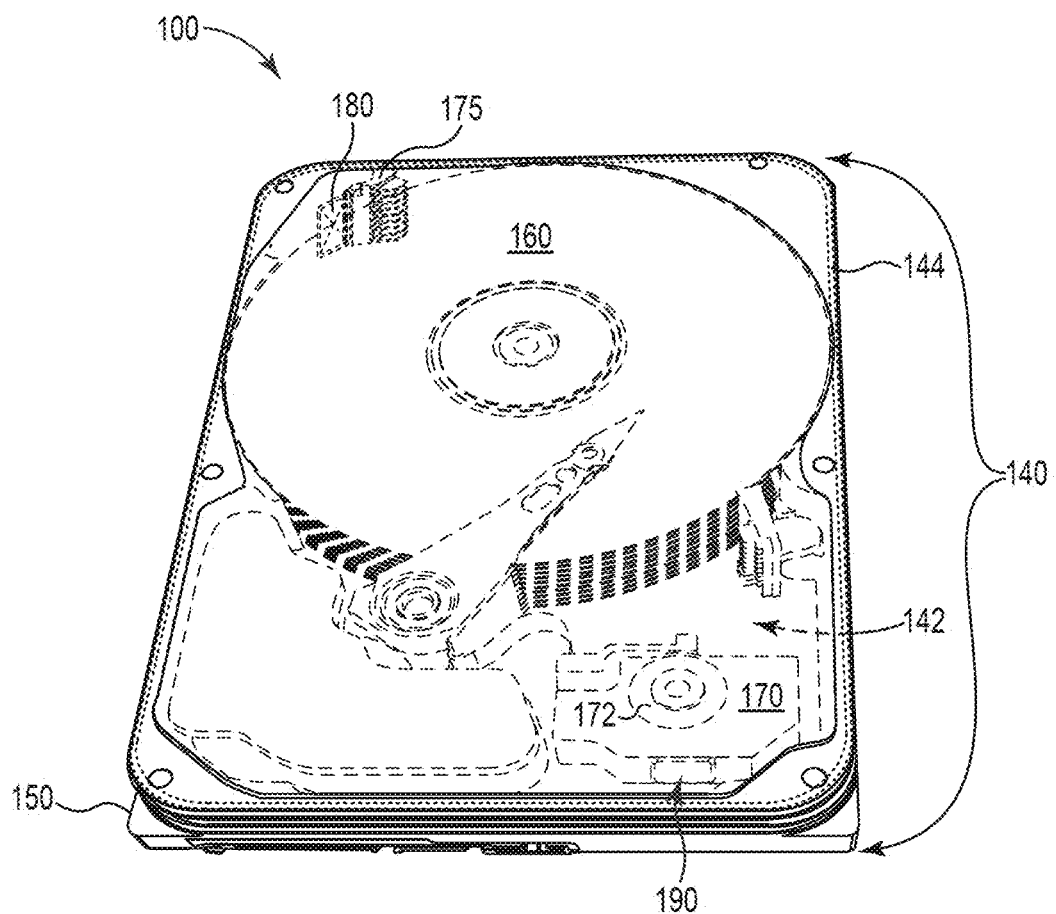
FIG. 1B is a schematic showing a perspective view of the hard disk drive shown in FIG. 1A in its assembled configuration and showing interior components in broken lines.

Top cover 160 is configured to couple to base 150 to enclose components of data storage device 100, as shown in FIG. 1B. As shown, top cover 160 is aligned with and coupled to a surface of base 150, such as a surface 158 shown in FIG. 1A, to define an interior volume 142 of data storage device 100, which includes an interior gas space. Components other than those illustrated or specifically identified in FIGS. 1A and 1B and described herein are contemplated as being positioned within the interior volume 142, such as a preamp, a load/unload ramp, and/or assembly hardware, for example. Top cover 160 can be coupled to base 150 using any suitable technique, such as using one or more screws, connection fingers, locking/clipping structures, adhesives, rivets, other mechanical fasteners, welding (e.g., ultrasonic welding) or combinations thereof.

In some embodiments, data storage device 100 can further include one or more seals 144 disposed between base 150 and top cover 160 and configured to seal the interior volume 142 of data storage device 100. In embodiments, seal 144 can be a weld formed between base 150 and top cover 160, or seal 144 can be a form-in-place gasket (FIPG). Examples of a FIPG include epoxy (e.g., a two-part epoxy) and acrylate, among others. The FIPG may be applied along an outer edge of top cover 160 and/or base 150 and thermally cured after coupling top cover 160 to base 150, for example. Other methods of sealing can additionally or alternatively be used to connect the base 150 to top cover 160.

A gas or gas mixture may be added to interior volume 142 of data storage device 100. Helium, for example, may be included in interior volume 142 to reduce mechanical vibrations, particularly of head gimbal assemblies (HGAs) of data storage device 100. Helium may also be included within data storage device 100 to enable lower head-media spacing (HMS) between a reader and/or writer of a magnetic recording head and a magnetic disk, and thus a higher areal density capability (ADC) of data storage device 100.

In some embodiments, data storage device 100 can be a hermetically sealed data storage device, which can be defined by, e.g., the amount of gas (e.g., helium) that leaks from the data storage device after it has been sealed (e.g., a welded HDD). In some embodiments, a hermetically sealed data storage device having its interior gas space filled with helium gas has a nominal helium leak rate of less than 10% by volume in five years. In some embodiments, in terms of (atm cc/second), a hermetically sealed data storage device having its interior gas space filled with helium gas has a nominal helium leak rate of $10\times10^{-8}$ atm (atmosphere) cc (cubic centimeter)/second or less at 25° C.; $8\times10^{-8}$ atm cc/second or less, $5\times10^{-8}$ atm cc/second or less; or even $4\times10^{-8}$ atm cc/second or less at 25° C.

Data storage device 100 includes a head stack assembly (HSA) 110 and one or more magnetic recording disks 108 configured to store bits of data.

HSA 110 further includes a plurality of HGAs 120. Each HGA 120 includes a magnetic recording head 130 with a read head and a write head for reading data from and writing data to a surface of a magnetic recording disk 108. Other components of a magnetic recording head 130 can be included, such as heaters, heat sinks, and piezoelectric actuators, for example.

Data storage device 100 further includes a motor assembly 105 configured to rotatably support magnetic recording disks 108 and circumferentially rotate magnetic recording disks 108 about an axis of rotation during operation. Magnetic recording disks 108 are mounted on motor assembly 105 such that an annular volume of each magnetic recording disk 108 encircles a portion of motor assembly 105. Motor assembly 105 may rotate magnetic recording disks 108 during an operation of data storage device 100 such that each magnetic recording disk 108 moves relative to a respective magnetic recording head 130 to enable the magnetic recording head 130 to read data from and/or write data to the magnetic recording disk 108.

Data storage device 100 also includes a voice coil drive actuator 112 that produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus magnetic recording heads 130, to move relative to magnetic recording disks 108.

Data storage device 100 includes a diverter 175 that is proximal to magnetic disks 108. Diverter 175 is configured to divert helium and/or other interior gas mixtures(s) to reduce windage on rotatable drive actuator arms 118 which can reduce undesired vibrations that may cause a magnetic recording head 130 to move off track and/or contact a magnetic disk 108. As shown in FIG. 1A, data storage device 100 utilizes voice coil drive actuator 112 to move HGAs 120 relative to magnetic recording disks 108; however, it is understood that other means of moving HGAs 120, such as a voice coil motor (VCM), are contemplated.

Moisture and/or organic material in an interior volume of an HDD can lead to reduced performance (e.g., reduced areal density capability) and/or reduced lifetime of an HDD. In particular, water vapor, organic aerosol particulates, and organic vapor from a variety of sources (e.g., outgassing) can compromise performance of an HDD by contaminating, degrading, and/or damaging components such as magnetic recording heads. An HDD may include one or more components configured to mitigate moisture and/or organic contamination. The illustrated data storage device 100 includes components having an adsorbent composition in the form an article that permits the components to be positioned and/or mounted in the interior volume 142 of data storage device 100 so that the adsorbent composition can adsorb moisture and/or organic vapors from the interior gas. In some embodiments, a component can also include filtering capability to remove organic particulate material. As shown in FIGS. 1A and 1B, non-limiting examples of such components include an environmental control module 170 (including inlet diffuser seal 172), a recirculation filter 180, and a label filter 190 for such a purpose.

In heat-assisted magnetic recording (HAMR) HDD, a magnetic recording head 130 may include a light source such as a laser, a waveguide, and a near-field transducer (NFT) to heat and lower the coercivity of magnetic grains in a spot of focus on a magnetic recording disk 108.

Figure 2:
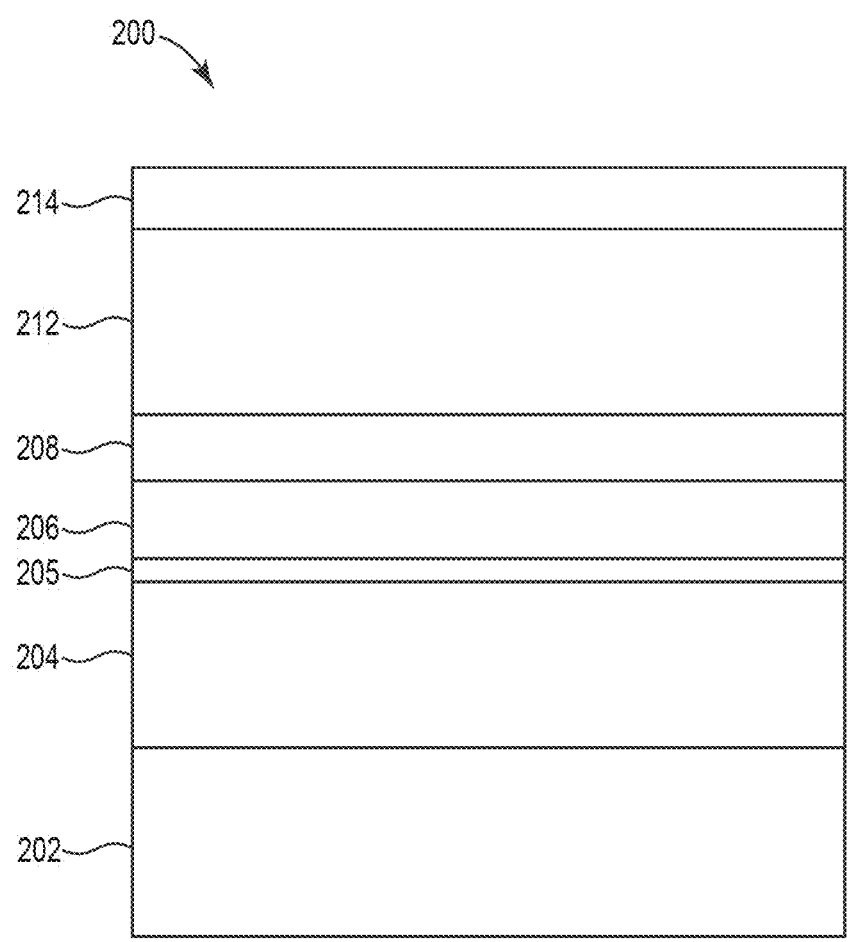
FIG. 2 is a schematic showing a cross-section of a magnetic stack.

FIG. 2 illustrates an example of a magnetic stack 200 that may represent an example of a magnetic recording disk 108 used in a heat assisted magnetic recording (HAMR) hard disk drive (HDD). As shown in FIG. 2, magnetic stack 200 includes substrate 202, soft magnetic underlayer 204, seed layer 205, heatsink layer 206, interlayer 208, magnetic recording layer 212, and overcoat layer 214.

In some embodiments, substrate 202 is disc-shaped and may include a non-magnetic metal, alloy or non-metal. For example, substrate 202 may include aluminum, an aluminum alloy, glass, ceramic, glass-ceramic, polymeric material, a laminate composite, or any other suitable non-magnetic material.

Soft magnetic underlayer (SUL) 204 is configured to function as a return path for magnetic flux produced by a magnetic write field during a write operation. In some examples, SUL 204 is disposed on a top surface of substrate 202. SUL 204 may include one or more layers of a soft magnetic material, such as CoFe, FeCoB, FeAlN, NiFe, or FeTaN, or combinations thereof. In one example, SUL 204 is approximately 10 nm to approximately 300 nm thick. SUL 204 may include multiple layers, which may be laminated structures and/or antiferromagnetically coupled layers.

Seed layer 205 is configured to promote growth of heat sink layer 206. Seed layer 205 is disposed on top of SUL 204. Seed layer 205 may include one or more layers of AlCr, CrRu, AlCrRu, ZnO, ZrN or combinations thereof. Typical seed layer thicknesses range from about 10 nm to about 30 nm. Seed layer 205 can be deposited with known physical or chemical deposition techniques such as radio frequency (RF) sputtering, direct current (DC) sputtering, reactive magnetron sputtering, chemical vapor deposition (CVD), pulsed laser deposition, molecular beam epitaxy, and atomic layer deposition (ALD).

Heatsink layer 206 is configured to dissipate heat from one or more layers of magnetic stack 200. As illustrated in FIG. 2, heatsink layer 206 is disposed on top of seed layer 205.

Magnetic stack 200 also includes an interlayer 208 which is disposed on a top surface of heatsink layer 206. Interlayer 208 may provide one or more functions for magnetic stack 200. Interlayer 208 separates the magnetic recording layer 212 from the layers beneath it. In some examples, interlayer 208 controls the growth orientation of magnetic recording layer 212.

Magnetic recording layer 212 is configured to store data. Magnetic recording layer 212 is disposed on a top surface of interlayer 208. A magnetic recording layer according to the present disclosure is discussed in more detail below.

Overcoat layer 214 is configured to protect magnetic recording layer 212 from corrosion and mechanical damage during drive operation. As illustrated in FIG. 2, overcoat layer 2114 is disposed on a top surface of magnetic recording layer 212. Overcoat layer 214 may be thermally and mechanically robust. For example, overcoat layer 214 may have a high melting point (e.g., a temperature which exceeds the Curie temperature of the magnetic recording layers), which may enable overcoat layer 214 to withstand HAMR writing conditions where temperatures may exceed at least 300° C. at the media surface during the narrow recording window. In some examples overcoat layer 214 is a carbon-based material. Examples of carbon-based materials include diamond-like carbon (DLC) or tetrahedral amorphous carbon (ta-C). Other examples of overcoat materials include silicon nitride ($Si_xN_y$) or silicon oxy-nitride and hydrogenated amorphous carbon (a-C:H). In the example of FIG. 2, overcoat layer is between about 2 nm and 3 nm in thickness. In some examples, overcoat layer may include a lubrication layer.

Cumulative failure rate (CFR) in the context of a data storage device such as a HAMR HDD is a parameter that describes the performance and the ability to increase areal density capability (ADC). Magnetic recording media that includes magnetic grains formed via lithography involves exchange-decoupled magnetic grains with perpendicular (out of plane) anisotropy, with each bit containing multiple magnetic grains. Anisotropy is the degree of difficulty to change the magnetic orientation of grains in the magnetic recording layer. Areal density capability (ADC) can be increased by reducing the size of a bit, which means that the number of magnetic grains per bit would be reduced. Reducing the number of grains per bit can unfortunately lead to inhomogeneous field patterns. While the grain size can be reduced to increase the number of grains in a reduced bit size, reducing the grain size can cause thermal instability. Grain size refers to volume "V" in equation 1 as follows:

$$\frac{K_{ueff} * V}{k_B * T}, \quad (1)$$

where $K_{ueff}$=effective ferromagnetic anisotropy constant due to FM-AFM coupling; T=absolute temperature (K); and $k_B$=Boltzmann constant.

Inhomogeneous field patterns and/or thermal instability can reduce the signal-to-noise (SNR) ratio. While bit-patterned media can help manage small grain related issues, bit-patterned media can be costly to manufacture.

According to one aspect of the present disclosure, a magnetic stack includes a magnetic recording layer having a plurality of ferromagnetic, discrete regions located within an antiferromagnetic matrix. Each ferromagnetic region corresponds to a magnetic domain for storing a bit of data. The discrete, regions can resemble "bit-patterned" media, but the discrete, regions are not formed via lithography. According to the present disclosure, the plurality of ferromagnetic, discrete regions are converted "on-disk" from a continuous layer of antiferromagnetic material via a variety of methods (discussed below). As discussed below, the ferromagnetic, discrete regions can be relatively small in size without having undue thermal stability issues. Further, a magnetic recording layer according to the present disclosure can have improved areal density capability (ADC) and/or signal-to-noise ratio (SNR).

Figure 3A:
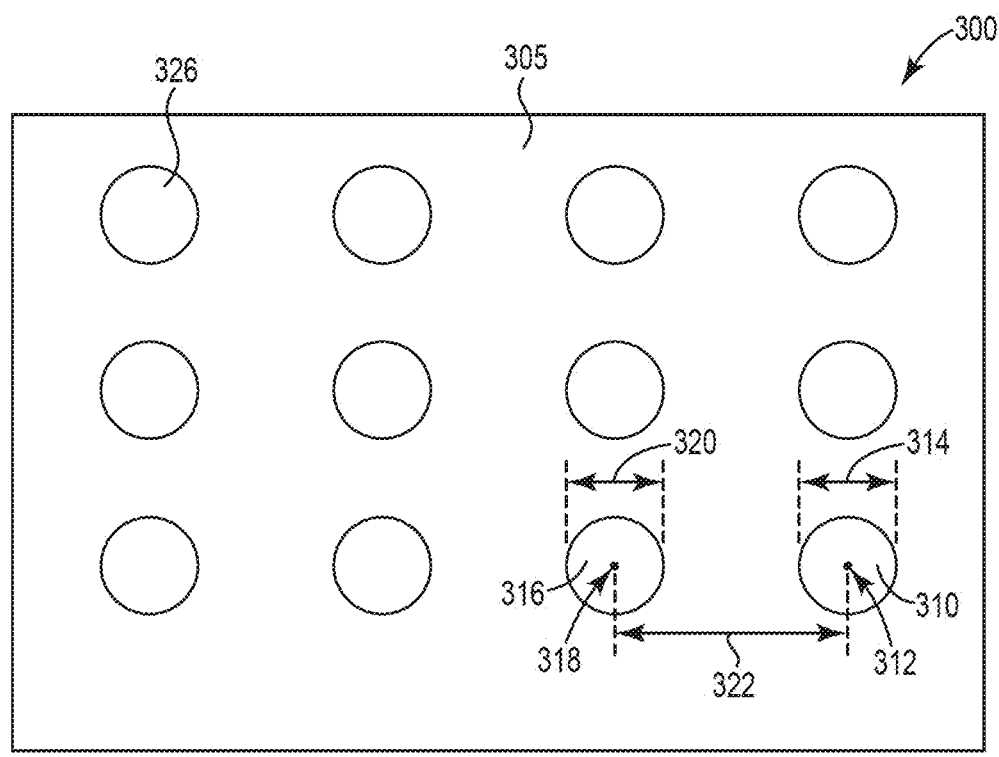
FIG. 3A is a schematic showing a partial top view of a magnetic layer according to the present disclosure.
Figure 3B:
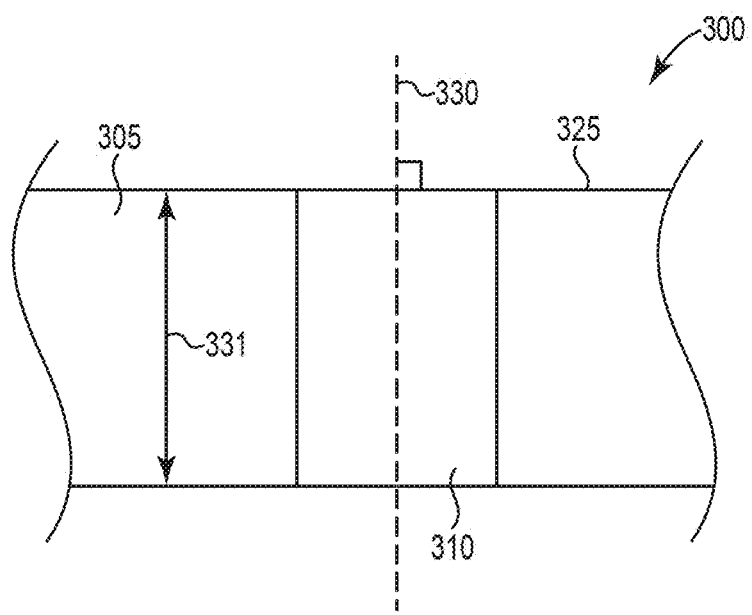
FIG. 3B is a schematic showing a partial cross-section of the magnetic layer in FIG. 3A.

A non-limiting example of a magnetic recording layer according to the present disclosure is illustrated in FIGS. 3A and 3B. As shown in FIG. 3A, magnetic recording layer 300 includes a plurality of ferromagnetic, discrete regions such as 310, 316, and 326 that are located within an antiferromagnetic matrix 305. As used herein, "ferromagnetic" (FM) refers to a type of magnetism of a material where all of the molecular magnetic dipoles are pointed in the same direction. Ferromagnetism is the strongest type of magnetism and allows a material to form a permanent magnet. As used herein, "antiferromagnetic" (AFM) refers to a type of magnetism of a material where the magnetic moments of atoms or molecules, often related to the spins of electrons, align in a regular pattern with neighboring spins pointing in opposite directions. Each ferromagnetic, discrete region such as 310, 316, and 326 corresponds to a magnetic domain for storing a bit of data. Thermal stability of the ferromagnetic, discrete regions can be achieved through FM-AFM interfacial exchange coupling (IEC). Also, perpendicular magnetization can be achieved by annealing the system in an external magnetic field applying in an out of plane direction.

Figure 4:
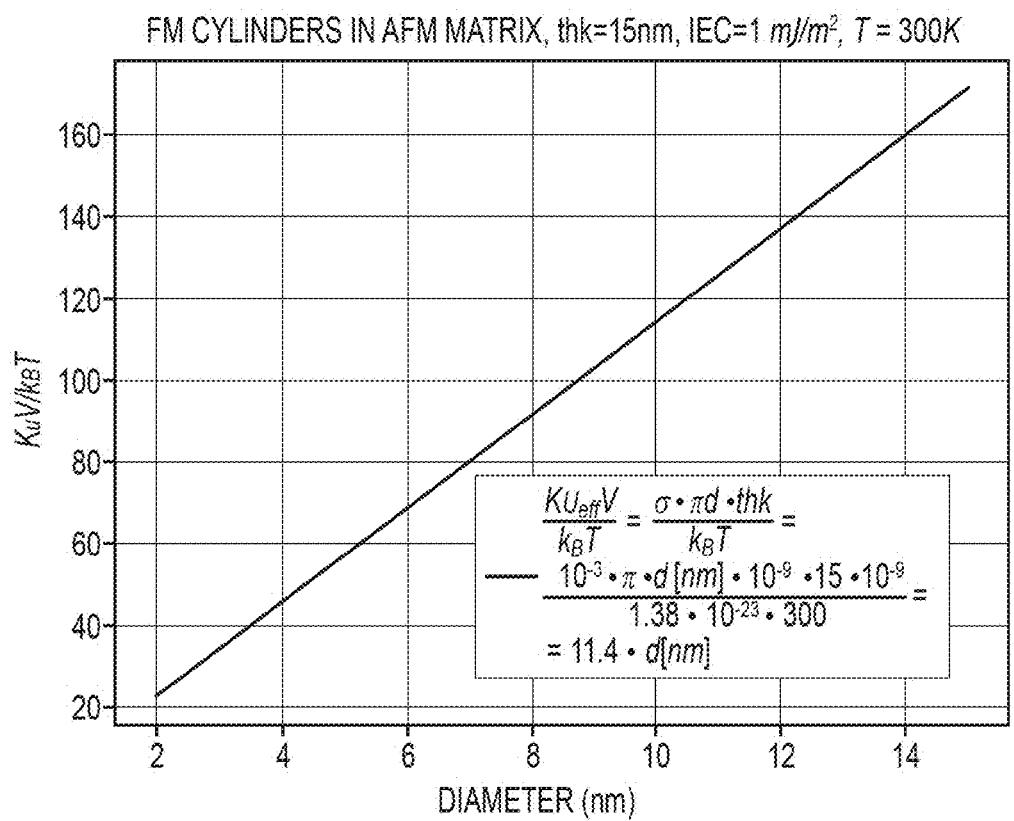
FIG. 4 is a graph that represents calculations of diameter versus $(K_{ueff}*V)/(k_B*T)$ ratio for cylinder-shaped, ferromagnetic, discrete regions.

An example of determining how low the diameter of a ferromagnetic, discrete region can be for a given set of conditions, while achieving desirable thermal stability and ADC at the same time will be described below using FIGS. 3A, 3B, and 4, for illustration purposes. For example, if the geometry of each ferromagnetic, discrete region is assumed to nominally be a right cylinder, and the magneto-crystalline anisotropy of the material for each ferromagnetic, discrete region is assumed to be zero, one can write the following formula (2):

$$K_{ueff} = \sigma * \pi * d * \frac{t}{\pi * \left(\frac{d}{2}\right)^2 * t} = \frac{4 * \sigma}{d} \quad (2)$$

Here, "σ" refers to IEC energy density; "d" refers to the diameter of ferromagnetic, discrete region, which is illustrated as a right cylinder; and "t" refers to the cylinder height of each ferromagnetic, discrete region, which in the illustrated case corresponds to the thickness of the magnetic recording layer. As mentioned above, $K_{ueff}$ is the effective ferromagnetic anisotropy constant due to FM-AFM coupling.

Referring to FIG. 3B, ferromagnetic, discrete regions are nominally (approximately) illustrated schematically in the three-dimensional shape of a right cylinder. A right cylinder has bases that are circular in shape and parallel to each other. The axis of the cylinder joins the center of the two bases of the cylinder The axis of this cylinder is a line through the center of the circle, the line being perpendicular to the plane of the circle. As shown in FIG. 3B, ferromagnetic, discrete region 310 has an axis 330 that is perpendicular to a major surface 325 of the magnetic recording layer 300. Alternatively, one or more three-dimensional shape of ferromagnetic, discrete regions can be a variety of shapes, which can depend on the method of converting the discrete regions in the AFM matrix into ferromagnetic, discrete regions (discussed below).

The IEC energy density can vary depending of material of the AFM matrix. Interfacial exchange coupling energy density refers to the energy associated with the exchange interaction between magnetic moments across an interface between two magnetic materials. IEC energy density can be extracted from the magnetic hysteresis loop using formula $IEC=\mu_0 M_s t_p H_{eb}$, where $\lambda_0 M_s$ is the ferromagnetic material's spontaneous magnetization in Tesla, $t_F$ is the thickness of the ferromagnetic film in meters, and $H_{eb}$ is the value of the exchange bias field (shift of the magnetic hysteresis loop along the field axis) measured in Ampers per meter. In the present disclosure, the interface is between the ferromagnetic, discrete regions and the AFM matrix. The exchange interaction between the spins of the atoms at the interface can lead to a coupling between the magnetic moments of a ferromagnetic, discrete region and the AFM matrix. The strength of the interfacial exchange coupling energy density determines the degree of coupling between the magnetic regions and can significantly influence the magnetic properties of the structure.

In some embodiments, the interfacial exchange coupling energy density between each ferromagnetic, discrete region and the antiferromagnetic matrix is 0.5 (mJ/m$^2$) or greater, 1 (mJ/m$^2$) or greater, or even 2 (mJ/m$^2$) or greater. In some embodiments, the interfacial exchange coupling energy density between each ferromagnetic, discrete region and the antiferromagnetic matrix is from 0.5 to 5 (mJ/m$^2$), or even from 1 to 3 (mJ/m$^2$).

A variety of materials can be used in a magnetic recording layer (AFM matrix) according to the present disclosure. It is noted that one or more materials selected may be changed or modified by changing the composition of antiferromagnetic composition, the crystallographic phase, and the like. A material used in a magnetic recording layer (AFM matrix) according to the present disclosure can be selected based on one or more conditions at which the material converts from antiferromagnetic phase to ferromagnetic phase. For example, a material for the magnetic recording layer can be selected based on its Neel temperature. The Neel temperature is a temperature limit at which an antiferromagnetic material becomes paramagnetic. According to the present disclosure, the AFM matrix has a Neel temperature that is above the operating temperatures of an HDD so that the material does not convert to the paramagnetic phase during operation of the HDD. In some embodiments, the operating temperature of an HDD can be in a range from 0° C. to 75° C., from 0° C. to 70° C., or even from 5° C. to 65° C. In some embodiments, the AFM matrix has a Neel temperature greater than 350K, greater than 400K, greater than 450K, greater than 500K, or even greater than 600K.

A material used in a magnetic recording layer according to the present disclosure can also be selected based on its saturation magnetization ($M_s$) in the ferromagnetic state. The $M_s$ refers to the state reached when an increase in applied external magnetic field cannot increase the magnetization of the material any further. In some embodiments, a material selected for making a recording layer according to the present disclosure can have an $M_s$ value that is advantageously characteristic of a soft magnetic material. For example, an FeRh alloy in the ferromagnetic state can have a saturation magnetization ($M_s$) of 1.6 Teslas (T), which is almost a factor of 3 times larger than the $M_s$ value for FePt. Such a relatively high saturation magnetization is beneficial for reading operations and can result in a relatively higher SNR.

In some embodiments, a magnetic recording layer according to the present disclosure can include one or more manganese alloys that are antiferromagnetic and have a Neel temperature greater than the operating temperature of an HDD. In some embodiments, a magnetic recording layer according to the present disclosure can include one or more oxides, one or more nitrides, and combinations thereof, of at least one of iron (Fe), nickel (Ni), cobalt (Co). The one or more oxides and/or the one or more nitrides can have a Neel temperature greater than the operating temperature of an HDD. Such materials can be locally converted into ferromagnetic, discrete regions by applying an electric field, as discussed below. In some embodiments, a magnetic recording layer according to the present disclosure can include one or more iron-rhodium (FeRh) alloys, which can be locally converted into ferromagnetic, discrete regions via heating, as discussed below.

Figure 5:
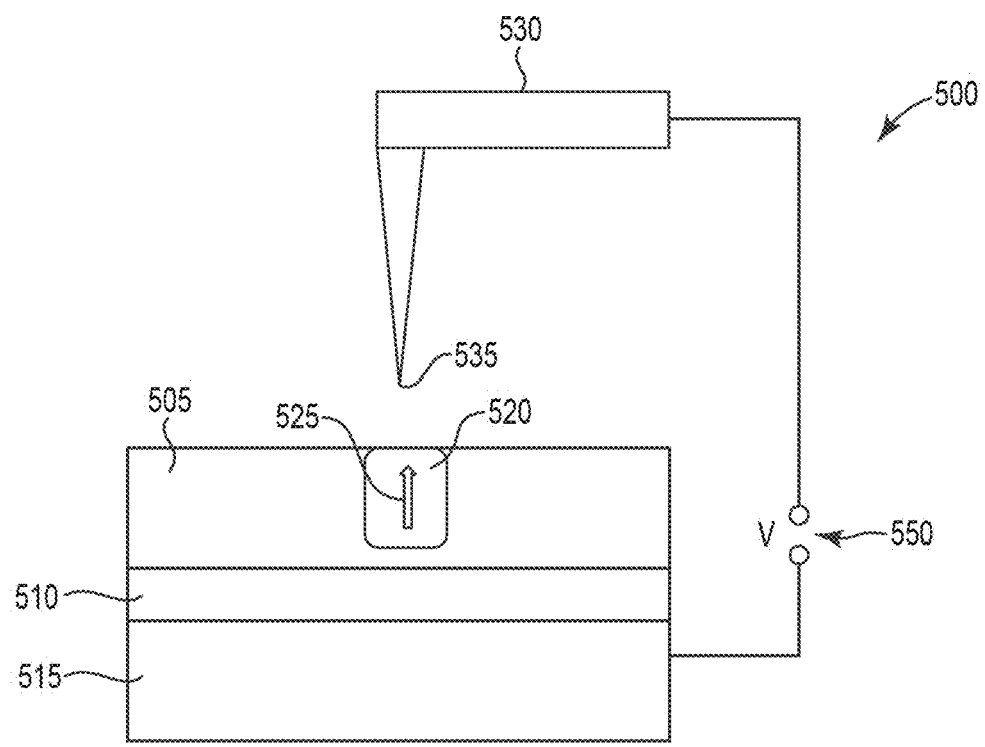
FIG. 5 is a schematic illustrating a non-limiting example of a system for making a magnetic layer according to the present disclosure.

As mentioned above, formula (2) depends on "t," which refers to the cylinder height of each ferromagnetic, discrete region. As shown in FIG. 3B, "t" corresponds to the thickness 331 of the magnetic recording layer 300. Alternatively, "t" can be less than the thickness of a magnetic recording layer (e.g., as illustrated in FIG. 5), which can provide an additional antiferromagnetic interface between a ferromagnetic, discrete region and the AFM matrix. In some embodiments, a magnetic recording layer according to the present disclosure has a thickness of 1 nanometer or greater, 2 nanometers or greater, 3 nanometers or greater, 4 nanometers or greater, 5 nanometers or greater, 10 nanometers or greater, or even 15 nanometers or greater. In some embodiments, a magnetic recording layer according to the present disclosure has a thickness of 10 nanometers or less, or even 5 nanometers or less. In some embodiments, a magnetic recording layer has a thickness of from 1 to 30 nanometers, or even from 5 to 25 nanometers.

As mentioned above, formula (2) depends on "d," refers to the diameter of ferromagnetic, discrete region in the form of a right cylinder. As shown in FIG. 3A, discrete region 310 has a diameter "d" corresponding to 314, and ferromagnetic, discrete region 316 has a diameter "d" corresponding to 320. As discussed below, relatively small "bit" (ferromagnetic, discrete region) diameters that are thermally stable can be achieved according to the present disclosure so as to provide desirable ADC. In some embodiments, each of the plurality of ferromagnetic, discrete regions have diameter of 5 nanometers or less, 4 nanometers or less, 3 nanometers of less, or even 2 nanometers or less.

In some embodiments, desirable thermal stability for magnetic recording media can be achieved when the $(K_{ueff}*V)/(k_B*T)$ ratio is 50 or greater, 60 or greater, or even 70 or greater. Referring to equation (2) above, if "o" (IEC energy density) is 1 (mJ/m$^2$); the cylinder height ("t") of each ferromagnetic, discrete region is 15 nanometers; and the temperature (T) is 300K, then a graph of $(K_{ueff}*V)/(k_B*T)$ versus diameter "d" of a ferromagnetic, discrete region is shown in FIG. 4. As can be seen in FIG. 4, if the ratio of at least 60 is desired, then it can be achieved at about 5 nm diameter, which advantageously corresponds to bit diameter. Referring to Equation (2) above, it can be seen that increasing "o" (IEC energy density) can permit even further reduction in the diameter of each ferromagnetic, discrete region (bit). As can also be seen, increasing cylinder height ("t") of each ferromagnetic, discrete region can also permit even further reduction in the diameter of each ferromagnetic, discrete region (bit). Finally, finite magnetocrystalline anisotropy of each ferromagnetic, discrete region, which was assumed to be zero in FIG. 4, can also help decrease the bit size further, by contribution to "$K_{ueff}*V$."

Modelling software shows that a field profile at 5 nanometers above the magnetic recording media surface of hexagonal close packed arrangement of FM bits in an AFM matrix provides the highest ADC corresponding to equation (3) as follows:

$$ADC \approx \frac{745 \, Tb}{a^2 \, in^2}, \quad (3)$$

where "a" is the distance between the bit centers, where "a" from Equation (2) is greater than "d." Referring to FIG. 3A, the distance between the bit centers is illustrated by distance 322, which refers to the distance "a" between the center 312 of ferromagnetic, discrete region 310 and the center 318 of adjacent ferromagnetic, discrete region 316. An example was modeled where a=15 nanometers and d=10 nanometers. The modeling software shows a difference in field intensity, which is due to edge effects, as the demagnetization field is stronger in the center of the hexagonal packed arrangement of FM bits in an AFM matrix. If the minimum bit diameter (d=5 nm) while maintaining thermal stability described above with respect to FIG. 4 is used in Equation (3), a=6 nm can be used, thereby providing an ADC over 20 Tb/in². As discussed above with Equation (2), the ADC value can be further increased by increasing the IEC energy density ("σ") and/or media thickness ("t").

In some embodiments, like ferromagnetic, discrete regions 310 and 316, each ferromagnetic, discrete region has a center and a diameter, and each pair of adjacent ferromagnetic, discrete regions have a distance between the centers of the pair of adjacent ferromagnetic, discrete regions. The distance between the centers of the pair of adjacent ferromagnetic, discrete regions distance is greater than the diameter. In some embodiments, the distance is 5 nanometers or less, 4 nanometers or less, 3 nanometers or less, 2 nanometers or less, 1 nanometer or less, or even 0.5 nanometers or less.

As illustrated herein above, ferromagnetic, discrete regions according to the present disclosure can be relatively small and tightly packed so as to provide significant ADC. In some embodiments, a magnetic recording layer according to the present disclosure has an areal density capacity (ADC) of greater than 20 (Tb/in²), greater than 40 (Tb/in²), or even greater than 60 (Tb/in²).

A magnetic recording layer according to the present disclosure, such as magnetic recording layer 300, can be made using an "on-disk" method, which is different from lithography.

An "on-disk" method of making a magnetic recording layer according to the present disclosure involves forming a continuous layer over an entire major surface of a substrate that would correspond to the recording layer of a magnetic recording disk like magnetic recording disk 108. The layer includes a magnetic composition that is antiferromagnetic. Then, a plurality of discrete regions in the layer are converted "on disk" into ferromagnetic, discrete regions within a matrix of the antiferromagnetic composition to form the magnetic recording layer. Each ferromagnetic, discrete region corresponds to a magnetic domain for storing a bit of data.

In some embodiments, converting a plurality of discrete regions in the layer into ferromagnetic, discrete regions includes heating each of the plurality of discrete regions in the layer to at least a temperature that causes each of the plurality of discrete regions to convert into ferromagnetic, discrete regions. After a discrete region converts to the ferromagnetic state, it can be allowed to cool (e.g., passively cool) to room temperature where it will remain in the ferromagnetic state due to thermal hysteresis centered around operation temperature.

Heating to convert the discrete regions in an antiferromagnetic matrix into ferromagnetic regions can take advantage of materials that exhibit such a conversion when heating above room temperature, but to a temperature that is less than the Neel temperature of the antiferromagnetic matrix. For example, FeRh alloy exhibits an AFM-FM transition near 100° C. in the bulk material. So, FeRh alloy exhibits an AFM-FM transition when heating above room temperature. The transition temperature and the thermal hysteresis of FeRh bulk alloys and thin films can be adjusted by changing the composition of the layer of the antiferromagnetic composition, the crystallographic phase, strain, and the like. For example, the phase transition in FeRh from an antiferromagnetic state to the ferromagnetic state is described in, e.g., Komlev et al., "3D time-resolved analysis of the evolution metamagnetic phase transition in FeRh system." Thermal hysteresis is the difference of the AFM-FM transition temperature when heating as compared to cooling.

A non-limiting example of heating to convert discrete regions in an antiferromagnetic matrix into ferromagnetic regions includes directing laser energy toward a major surface of a substrate to convert the plurality of discrete regions in the layer into the ferromagnetic, discrete regions. A beam of the laser energy that intersects the first major surface has a diameter that is equal to or substantially corresponds to a diameter of a corresponding discrete region. The beam of laser energy can heat a region of the antiferromagnetic layer (e.g., from room temperature) to the transition temperature that causes the antiferromagnetic material located in the region to convert to the ferromagnetic state. The transition temperature is below the Neel temperature for the material selected so that the antiferromagnetic material does not convert to the paramagnetic phase instead of the ferromagnetic phase. After converting to the ferromagnetic state, the beam of laser energy can be removed so that the ferromagnetic region cools (e.g., back to room temperature). A convenient source of laser energy can be supplied from a near-field transducer in a heat-assisted magnetic recording head. Instead of directing a laser in a heat-assisted magnetic recording head toward a substrate for read/write operations, it can be used to heat and convert discrete regions in an antiferromagnetic matrix into ferromagnetic regions. An example of heat-assisted magnetic recording head having a laser is described in U.S. Pat. No. 10,490,221 (Chen), wherein the entirety of said patent is incorporated herein by reference.

In some embodiments, converting a plurality of discrete regions in the layer into ferromagnetic, discrete regions includes applying an external electric field to each of the plurality of discrete regions in the layer of antiferromagnetic material for a time period to convert each discrete region into a ferromagnetic, discrete region. This method relies on magnetoionics, which involves electric-field (voltage) induced ion mobility and can take advantage of materials such as transition metal oxides (e.g., nickel oxide (NiO)). For example, NiO has a Neel temperature over 500K, which makes it suitable for hard-disk drive applications. In some embodiments, if desired, the layer of antiferromagnetic material may be heated above room temperature while applying an external electric field, which may accelerate ion mobility and decrease bit formation time.

A non-limiting example of a system 500 for applying an external electric field to convert discrete regions in an antiferromagnetic matrix into ferromagnetic regions is described using FIG. 5. A metallic layer 515 is provided between the layer 505 and substrate (not shown). Also, layer 510 is an electrically-insulating layer 510 can be provided between layer 505 and metallic layer 515. Layer 515 corresponds to a continuous layer of antiferromagnetic material. An external electric field can be applied by applying a voltage 550 between a metallic tip 535 in electrical communication with the layer 505 and metallic layer 515. For example, metallic tip 535 can be mounted to a movable arm 530 so that the metallic tip 535 can be positioned relative to the layer 505 as desired. The metallic tip 535 can have the same geometry as a magnetic writer of a read/write head, and can serve as an electrode. The metallic layer 515 can serve as another electrode. When voltage is applied between metallic layer 515 and metallic tip 535, oxygen or nitrogen ion migration is induced in layer 505, which is an oxide or nitride antiferromagnet, thereby changing the material's composition locally, making the corresponding region ferromagnetic. In FIG. 5, ferromagnetic, discrete region 520 has magnetization orientation represented by arrow 525. Also, ferromagnetic, discrete region 520 has a thickness less than layer 505, which provides the bottom of ferromagnetic, discrete region 520 with an additional antiferromagnetic interface between ferromagnetic, discrete region 520 and the AFM matrix of layer 505.

A magnetic recording layer can be thermally annealed in the presence of an applied magnetic field to "pin" the magnetic orientation of the ferromagnetic, discrete regions in the desired direction within the AFM matrix. Magnetic thermal annealing involves setting and stabilizing the magnetic orientation of ferromagnetic material, and involves heating the material in the presence of a strong magnetic field that is oriented in the desired direction of the magnetic domains with the ferromagnetic material. The material is slowly cooled while maintaining the applied magnetic field. As the temperature decreases, the magnetic domains with the ferromagnetic material become pinned in the direction of the applied magnetic field. After the material is cooled to room temperature, the magnetic field can be removed leaving the ferromagnetic material with the desired magnetic orientation.

Figure 6:
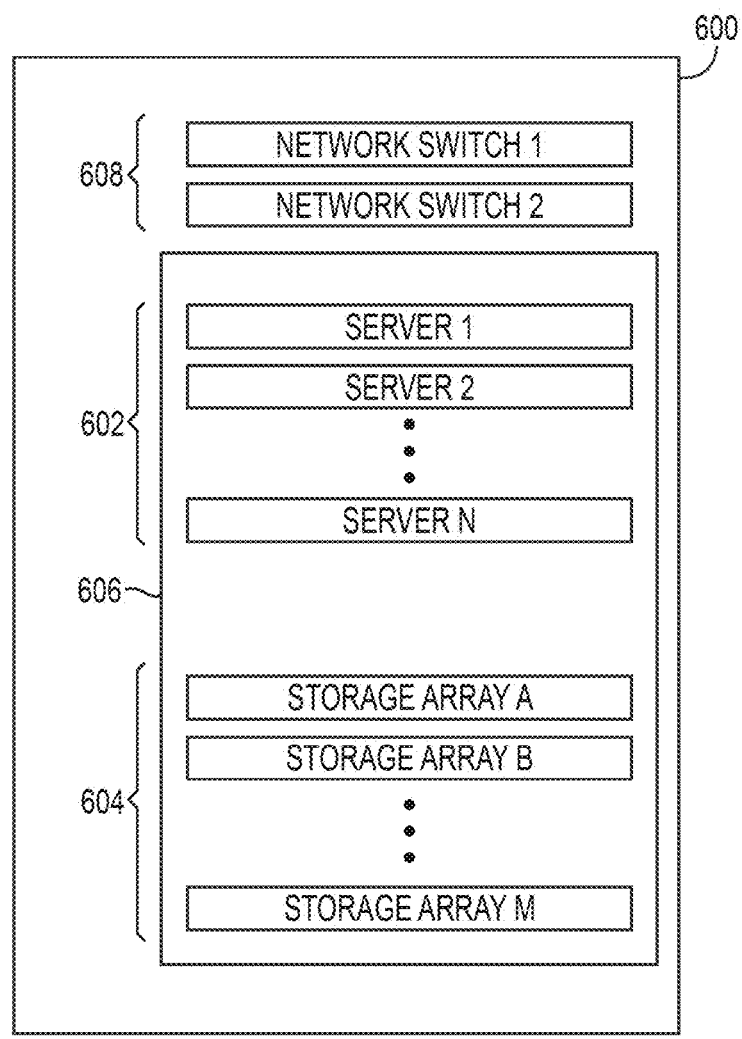
FIG. 6 is a block diagram of a data center system including a plurality of data storage devices including at least one magnetic stack having a magnetic layer according to the present disclosure.

FIG. 6 illustrates a non-limiting example of a computing system 600 that includes a plurality of data storge devices (e.g., data storage device 100) that include an absorbent composition according to the present disclosure. In FIG. 6, a diagram shows a computing system 600 that can have a computing enclosure used in network storage services. As shown, the computing enclosure includes a plurality of servers 602 coupled to a plurality of drive arrays 604 via a rack-level network fabric 606. Each server 602 can include at least one CPU coupled to random access memory (RAM) and an input/output (IO) subsystem. Each server 602 may have one or more dedicated power supplies (not shown) or the enclosure may provide power through a power bus (not shown). Each server 602 may also have an IO interface for connecting to the rack-level network fabric 606.

The drive arrays 604 may each include a separate sub-enclosure with IO busses, power supplies, storage controllers, etc. The drive arrays 604 include a plurality of individual data storage devices (e.g., HDD) densely packed into the sub-enclosure. An example of a data center that includes a computing system have a plurality of data storage devices is also described in U.S. Pat. No. 11,567,834 (Bent et al.).

What is claimed is:

1. A magnetic stack comprising a magnetic recording layer, wherein the magnetic recording layer comprises:
a plurality of ferromagnetic, discrete regions located within an antiferromagnetic matrix,
wherein the plurality of ferromagnetic, discrete regions are formed from corresponding discrete regions within the antiferromagnetic matrix by converting the antiferromagnetic discrete regions of the antiferromagnetic matrix into the plurality of ferromagnetic, discrete regions on disk, and
wherein the converting comprises:
i) heating each of the plurality of discrete regions within the antiferromagnetic matrix to at least a temperature that causes each of the plurality of discrete regions to convert into the ferromagnetic, discrete regions, and/or
ii) applying an external electric field to each of the plurality of discrete regions within the antiferromagnetic matrix for a time period to convert each of the plurality of discrete regions into the ferromagnetic, discrete regions.

2. The magnetic stack of claim 1, wherein each of the plurality of ferromagnetic, discrete regions have a right cylinder shape having an axis that is perpendicular to a major surface of the magnetic recording layer.

3. The magnetic stack of claim 2, wherein each of the plurality of ferromagnetic, discrete regions have a $(K_u*V)/(k_B*T)$ ratio of 60 or greater.

4. The magnetic stack of claim 3, wherein an interfacial exchange coupling energy density between each ferromagnetic, discrete region and the matrix is 0.5 (mJ/m$^2$) or greater.

5. The magnetic stack of claim 3, wherein the magnetic recording layer comprises a material chosen from one or more manganese alloys, one or more oxides, one or more nitrides, one or more iron-rhodium (FeRh) alloys, and combinations thereof.

6. The magnetic stack of claim 2, wherein each of the plurality of ferromagnetic, discrete regions have diameter of 5 nanometers or less.

7. The magnetic stack of claim 2, wherein each ferromagnetic, discrete region has a center and a diameter, wherein each pair of adjacent ferromagnetic, discrete regions have a distance between the centers of the pair of adjacent ferromagnetic, discrete regions, and wherein the distance is greater than the diameter.

8. The magnetic stack of claim 7, wherein the magnetic recording layer has an areal density capacity (ADC) of greater than 20 (Tb/in$^2$).

9. The magnetic stack of claim 2, wherein the magnetic recording layer has a thickness in a range from 5 to 30 nanometers.

10. A data storage device comprising:
a housing;
one or more electronic components disposed within the housing; and
at least one magnetic recording disk comprising a magnetic stack according to claim 1.

11. A computing system comprising a plurality of data storage devices according to claim 10.

12. A method of manufacturing at least a portion of a magnetic recording layer of a magnetic stack, wherein the method comprises:
forming a layer on a first major surface of a substrate, wherein the layer comprises at least one magnetic composition, wherein the at least one magnetic composition is antiferromagnetic; and
converting a plurality of discrete regions in the layer into ferromagnetic, discrete regions within a matrix of the at least one magnetic composition that is antiferromagnetic to form at least a portion of the magnetic recording layer of the magnetic stack, wherein each ferromagnetic, discrete region corresponds to a magnetic domain configured to store a bit of data, and
wherein the converting comprises:
i) heating each of the plurality of discrete regions within the antiferromagnetic matrix to at least a temperature that causes each of the plurality of discrete regions to convert into the ferromagnetic, discrete regions, and/or
ii) applying an external electric field to each of the plurality of discrete regions within the antiferromagnetic matrix for a time period to convert each of the plurality of discrete regions into the ferromagnetic, discrete regions.

13. The method of claim 12, wherein the at least one magnetic composition has a Neel temperature, and wherein the converting the plurality of discrete regions in the layer into the ferromagnetic, discrete regions comprises heating each of the plurality of discrete regions in the layer to the temperature, wherein the temperature is a transition temperature that is less than the Neel temperature.

14. The method of claim 13, wherein the heating comprises directing laser energy to the first major surface of a substrate to convert the plurality of discrete regions in the layer into the ferromagnetic, discrete regions, wherein a beam of the laser energy that intersects the first major surface has a diameter that is equal to a diameter of a corresponding discrete region, and wherein the laser energy is supplied from a near-field transducer in a heat-assisted magnetic recording head.

15. The method of claim 12, wherein the at least one magnetic composition comprises iron-rhodium (FeRh) alloy.

16. The method of claim 12, wherein the at least one magnetic composition comprises one or more oxides, one or more nitrides, and combinations thereof, of at least one of iron (Fe), nickel (Ni), cobalt (Co).

17. The method of claim 12, wherein the layer comprises a first layer, further comprising forming a second layer between the first layer and a substrate, wherein the second layer is metallic, and wherein applying the external electric field comprises applying a voltage between a metallic tip in electrical communication with the first layer and the second layer.

18. The magnetic stack of claim 1, wherein each ferromagnetic, discrete region corresponds to a magnetic domain for storing a bit of data.

19. The magnetic stack of claim 1, wherein the at least one magnetic composition has a Neel temperature, and wherein the converting the plurality of discrete regions in the layer into the ferromagnetic, discrete regions comprises heating each of the plurality of discrete regions in the layer to the temperature, wherein the temperature is a transition temperature that is less than the Neel temperature.

20. The magnetic stack of claim 1, wherein the layer comprises a first layer, further comprising forming a second layer between the first layer and a substrate, wherein the second layer is metallic, and wherein applying the external electric field comprises applying a voltage between a metallic tip in electrical communication with the first layer and the second layer.

* * * * *